US012152536B2

(12) United States Patent
Millier et al.

(10) Patent No.: US 12,152,536 B2
(45) Date of Patent: Nov. 26, 2024

(54) ELECTRICAL CONNECTION OF AN ELECTRICAL MACHINE IN AN AIRCRAFT TURBINE ENGINE

(71) Applicant: SAFRAN AIRCRAFT ENGINES, Paris (FR)

(72) Inventors: Vincent Francois Georges Millier, Moissy-Cramayel (FR); Loic Paul Yves Guillotel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/245,406

(22) PCT Filed: Sep. 8, 2021

(86) PCT No.: PCT/FR2021/051537
§ 371 (c)(1),
(2) Date: Mar. 15, 2023

(87) PCT Pub. No.: WO2022/058672
PCT Pub. Date: Mar. 24, 2022

(65) Prior Publication Data
US 2023/0349331 A1    Nov. 2, 2023

(30) Foreign Application Priority Data
Sep. 18, 2020   (FR) ...................................... 2009494

(51) Int. Cl.
*F02C 7/32*    (2006.01)
*F02C 7/268*   (2006.01)
*F02K 3/06*    (2006.01)

(52) U.S. Cl.
CPC ................ *F02C 7/32* (2013.01); *F02C 7/268* (2013.01); *F02K 3/06* (2013.01)

(58) Field of Classification Search
CPC ............... F02C 7/32; F02C 7/268; F02K 3/06
See application file for complete search history.

(56) References Cited

U.S. PATENT DOCUMENTS

| 11,753,175 B2 * | 9/2023 | Millier ...................... F02K 3/06 |
| | | 415/121.3 |
| 11,881,754 B2 * | 1/2024 | Millier ................... H02K 5/225 |

(Continued)

FOREIGN PATENT DOCUMENTS

| EP | 1939406 A2 | 7/2008 |
| EP | 3246528 A1 | 11/2017 |

(Continued)

OTHER PUBLICATIONS

International Search Report and Written Opinion received for PCT Patent Application No. PCT/FR2021/051537, mailed on Nov. 18, 2021, 17 pages (8 pages of English Translation and 9 pages of Original Document).

*Primary Examiner* — William H Rodriguez
(74) *Attorney, Agent, or Firm* — WOMBLE BOND DICKINSON (US) LLP (57) ABSTRACT

An aircraft turbine engine including a gas generator, a fan, and an electrical machine, the stator of the electrical machine being connected to a power electronic circuit by at least one electrically conductive bar which extends substantially radially relative to the axis inside an IGV which forms part of a bladed angular segment, the bar being configured to be disassembled and removed from the turbine engine by disassembling and removing the segment.

11 Claims, 9 Drawing Sheets

(56) References Cited

U.S. PATENT DOCUMENTS

| | | | |
|---|---|---|---|
| 2007/0217905 A1* | 9/2007 | Bouiller | H02K 5/225 |
| | | | 415/122.1 |
| 2008/0150287 A1 | 6/2008 | Kern et al. | |
| 2009/0309432 A1* | 12/2009 | Bouiller | H02K 7/14 |
| | | | 310/71 |
| 2017/0334377 A1* | 11/2017 | Klemen | B60R 16/03 |
| 2018/0003066 A1* | 1/2018 | Green | F01D 21/003 |
| 2021/0017879 A1* | 1/2021 | Banham | H02K 7/1823 |
| 2021/0355840 A1* | 11/2021 | Charier | F01D 15/10 |
| 2021/0396141 A1* | 12/2021 | Charier | F02C 7/268 |
| 2021/0396149 A1* | 12/2021 | Guillotel | F01D 15/10 |
| 2021/0396193 A1* | 12/2021 | Guillotel | F02K 3/00 |
| 2022/0403751 A1* | 12/2022 | Millier | F01D 15/10 |
| 2022/0412267 A1* | 12/2022 | Millier | F02C 7/32 |
| 2023/0002066 A1* | 1/2023 | Millier | F01D 15/10 |
| 2023/0016978 A1* | 1/2023 | Millier | H02K 7/1823 |
| 2023/0125576 A1* | 4/2023 | Chassagne | H02K 7/1823 |
| | | | 290/52 |

FOREIGN PATENT DOCUMENTS

| | | | | |
|---|---|---|---|---|
| FR | 2842565 A1 | | 1/2004 | |
| FR | 2896537 A1 | | 7/2007 | |
| FR | 2922265 A1 | | 4/2009 | |
| FR | 3103854 A1 | * | 6/2021 | ............ B64D 27/24 |
| FR | 3103854 B1 | * | 1/2022 | ............ B64D 27/24 |
| WO | WO-2021111058 A1 | * | 6/2021 | ............ B64D 27/24 |

* cited by examiner

ELECTRICAL CONNECTION OF AN ELECTRICAL MACHINE IN AN AIRCRAFT TURBINE ENGINE

TECHNICAL FIELD OF THE INVENTION

The present invention relates to an aircraft turbine engine equipped with an electrical machine as well as a method for maintaining this turbine engine.

TECHNICAL BACKGROUND

The prior art comprises in particular the documents FR-A1-2 842 565, FR-A1-2 896 537, FR-A1-2 922 265 and EP-A1-3 246 528, which describe turbine engines equipped with electrical machines.

The aeronautical world is now asking many questions about the relevance of using hybrid engines for commercial aviation. The use of electrical energy is now considered not only to meet the functions of the aircraft but also to electrify the functions of the turbine engine.

This observation leads to the study of hybrid engine architecture solutions, combining fossil energy of the fuel and electrical energy to ensure the driving of the propulsion portion (fan of the turbine engine) and the supply of certain engine and/or aircraft functions.

These architectures can in particular be based on a high bypass ratio and reducer type architecture, but also on a multiple body architecture (2 or 3). In these architectures, the turbine engine comprises a low pressure body and a high pressure body, each body comprising a shaft connecting a rotor of a compressor to a rotor of a turbine.

It is known to equip an aircraft turbine engine with an electrical machine. We recall that an electrical machine is an electromechanical device based on the electromagnetism allowing the conversion of electrical energy into work or mechanical energy for example. This process is reversible and can be used to produce electricity.

Thus, depending on the final use of a machine, we use the terms of:
generator to designate an electrical machine producing electrical energy from a mechanical energy,
motor for an electrical machine producing a mechanical energy from an electrical energy.

An electrical machine can also behave in motor mode as well as in generator mode.

The integration of a high power electrical machine on the low pressure body of a turbine engine, in particular of the high bypass ratio type, is very complex. Several installation areas are possible but the advantages and the disadvantages of each are numerous and diverse (problem of mechanical integration of the machine, temperature resistance of the machine, accessibility of the machine, etc.).

One solution to this problem would be to integrate the electrical machine directly downstream of the fan of the turbine engine. However, one difficulty would be the connection of this machine to the power electronic circuit which is usually located at a distance from the machine.

The use of power harnesses would pose some technical problems in this environment. The large diameter harnesses have very large bending radii, which would not be compatible with this environment. The integration of harnesses would require supports to limit the transmission of vibrations to the surrounding parts and their damage.

The present invention proposes a solution to at least some of the problems discussed above.

SUMMARY OF THE INVENTION

The invention proposes an aircraft turbine engine, comprising:
a gas generator having a longitudinal axis,
a fan located at an upstream end of the gas generator and configured to rotate about said axis, and
an electrical machine of generally annular shape which is mounted coaxially downstream of the fan, and which comprises a rotor coupled in rotation to the fan and a stator,
the fan being configured to generate a main gas flow, a portion of which flows into a primary annular duct of the gas generator to form a primary flow, and another portion of which flows around the gas generator to form a secondary flow,
the primary duct being delimited by a first and a second annular envelopes coaxial with the gas generator, the primary duct being passed through by arms, referred to as IGV, connecting the first and second envelopes, as well as by tubular arms of an inlet casing located downstream of the IGV,
the gas generator comprising a third annular envelope which coaxially surrounds the second envelope, the second and third envelopes being connected together at their upstream ends to form an annular splitter nose for separating the primary and secondary flows,
the stator of the electrical machine being connected to a power electronic circuit by at least one electrically conductive bar which extends substantially radially with respect to said axis inside one of the IGV,
characterised in that said first and second envelopes are sectorised, each of the sectors of the first envelope being connected by IGV to one of the sectors of the second envelope, to form bladed angular segments, only a portion of these segments comprising an IGV through which passes said at least one bar which is rigidly connected to that IGV and to that segment and which is configured to be disassembled and removed from the turbine engine by disassembly and removal of that segment.

The present invention thus proposes a solution for the integration of an electrical machine, a first advantage being linked to the fact that in the integration area of this machine, ideally directly downstream of the fan and thus upstream of the compressor or the compressors, the temperatures prevailing there are relatively low and thus optimal for this machine. The rotor of the machine is driven by the fan and is therefore at a relatively low speed, in particular if the turbine engine comprises a reducer. In addition, the machine is located as close as possible to the flow ducts of the flows and has a relatively large diameter and can therefore produce significant power compared to the machines of the prior technologies.

Furthermore, the present invention provides a solution to the problem of electrical connection of the machine in this environment. This connection is ensured by one or more bars, each of which runs through an IGV, i.e. as close as possible to the splitter nose of the primary and secondary flows of the turbine engine.

The bar and the bladed segment are intended to be disassembled and removed together, and are therefore secured to each other and cannot be disassembled from each other, which has several advantages:

the advantage of sectoring the envelopes is that it isolates the function of transmitting electrical energy from the machine towards the power electronic circuits; the operator has the choice of using a segment comprising an IGV through which a bar passes, and which can be considered as a "conductive" (or electrically conductive) segment, or a segment comprising IGV without a bar and can be considered as a conventional segment;

the bar is preferably fully integrated into an IGV and profiled so as to fit as well as possible into the aerodynamic portion of the blading, thus considerably reducing its master torque;

the integration of the bar into an IGV also allows for significant stiffness of the IGV, which reduces the risks of vibrations due to excessive flexibility; the bar does not need to be specifically maintained in the IGV.

The turbine engine according to the invention may comprise one or more of the following characteristics, taken in isolation from each other, or in combination with each other:

the bar passes through the IGV without clearance, the bar comprises an electrically conductive core surrounded by an insulating sheath, the insulating sheath being embedded in a material of the IGV, the IGV through which the bar passes is solid, its material extending seamlessly from the sheath to aerodynamic external faces of the IGV, the sheath extends radially outwardly beyond the second envelope and away from a free end of the bar to leave that end free, and radially inwardly beyond the first envelope and away from an opposite free end of the bar to leave that end free, the third envelope is sectorised and comprises sectors which are releasably attached to the second envelope, each of the segments being associated with a sector of this third envelope, the bar is generally L-shaped, said first and second portions being substantially rectilinear and connected to each other by a junction located directly downstream of said splitter nose;

the bar has a polygonal and constant cross-section, and can be twisted;

the turbine engine comprises a nacelle casing that surrounds the gas generator, as well as bladings, referred to as OGV, for connecting the nacelle casing to said third annular envelope;

the nacelle casing defines a secondary flow duct of the secondary flow around the gas generator;

the OGV arms are located downstream of the IGV and approximately in line with the tubular arms of the inlet casing;

said second portion extends substantially in line with one of the OGV;

the gas generator comprises annular flanges for attachment to the OGV which are located between said second and third envelopes and which comprise notches for the passage of said second portion of the bar;

the bar comprises a radially internal end for releasably attaching to an element for electrically connecting to said stator, and a radially external end for releasably attaching to a harness for electrically connecting to said circuit;

the electrical machine is located upstream of said splitter nose;

the stator of the electrical machine is connected to the power electronic circuit by a plurality of electrically conductive bars evenly distributed around said axis;

the or each IGV through which the bar passes is oversized in relation to the other IGV;

said power circuit is located between the second and third envelopes; said harness has a core whose cross-section is identical to the cross-section of a body of the bar;

the cross-section of the bar, and in particular of its body, is constant along the entire length of the bar; and the bar is rigid;

the bar is soft and flexible and is similar to a stretch of harness or electric cable.

The present invention also relates to a bladed angular segment for a turbine engine as described above, which segment comprises:

a sector of first annular envelope, a sector of second annular envelope, at least one IGV that extends between these sectors and connect them together, an electrically conductive, preferably rigid, bar that passes through the IGV or one of the IGV and is non-detachable from that arm and the segment.

The present invention further relates to a method for maintaining a turbine engine as described above, comprising the steps consisting in:

a) disassembling and removing at least one portion of the third envelope, in particular at the level of said bar, and b) disassembling and removing a segment secured to a bar.

The method according to the invention may comprise one or more of the following steps, taken alone or in combination with each other:

during the steps a) and b), maintaining in place the connection bladings, referred to as OGV, for connecting a nacelle casing to said third annular envelope, between the steps a) and b), dissociate the bar from at least one electrical connecting harness, after the step b), removing an electrical connecting harness, this harness extending parallel to said longitudinal axis and being removed by axial translation towards downstream through arrangements of one of the tubular arms of the inlet casing.

BRIEF DESCRIPTION OF THE FIGURES

The invention will be better understood and further details, characteristics and advantages of the invention will become apparent from the following description made by way of non-limiting example with reference to the attached drawings, in which.

DETAILED DESCRIPTION OF THE INVENTION

Figure 1:
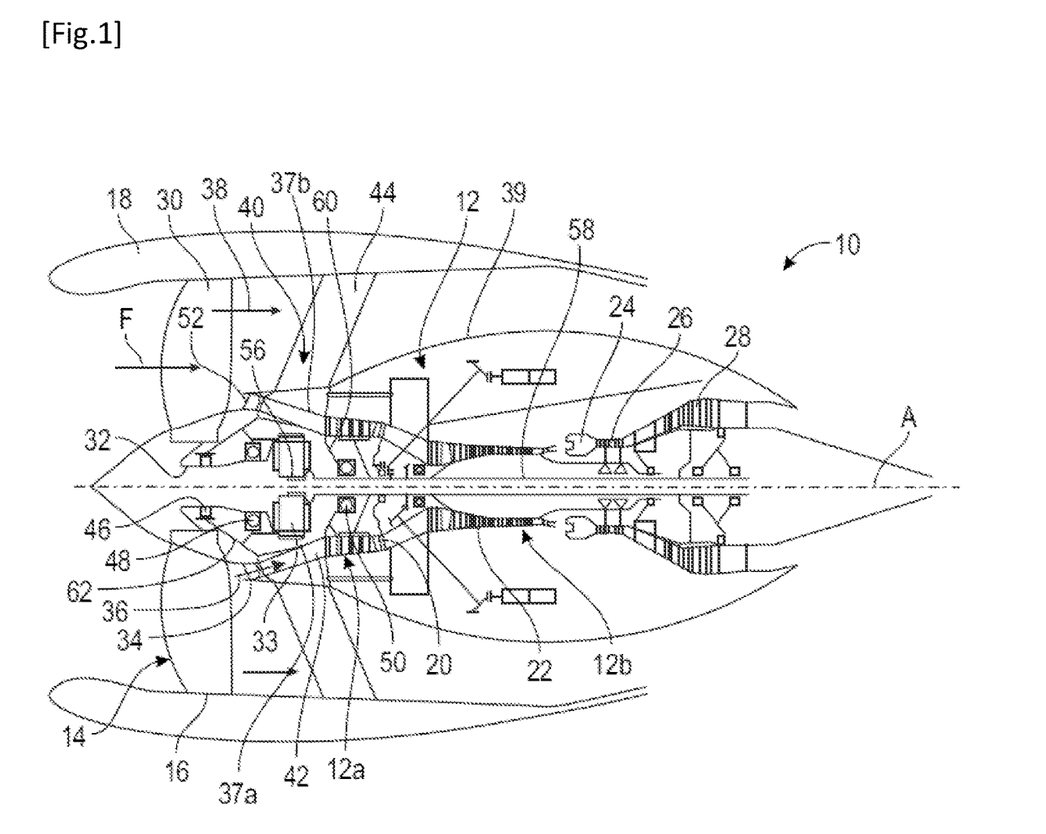
FIG. 1 is a schematic view in axial cross-section of an aircraft turbine engine with a high bypass ratio and reducer.

First, reference is made to FIG. 1, which schematically represents a double-body and double-flow aircraft turbine engine 10.

The turbine engine 10 conventionally comprises a gas generator 12, upstream of which is arranged a fan 14. The fan 14 is surrounded by a casing 16 which is surrounded by a nacelle 18 that extends around and along a major portion of the gas generator 12.

The gas generator 12 here comprises two bodies, namely a low pressure body 12a or LP and a high pressure body 12b or HP. Each body comprises a compressor and a turbine.

The terms "upstream" and "downstream" are considered along a main direction F of flow of the gases in the turbine engine 10, this direction F being parallel to the longitudinal axis A of the turbine engine.

From upstream to downstream, the gas generator 12 comprises a low-pressure compressor 20, a high-pressure compressor 22, a combustion chamber 24, a high-pressure turbine 26 and a low-pressure turbine 28.

The fan 14 comprises an annular row of vanes 30 driven in rotation by a fan shaft 32 which is connected to the rotor of the low pressure body 12a by means of a reducer 33. The gas flow passing through the fan (arrow F) is separated upstream of the gas generator 12 by an annular splitter nose 34 into a radially internal annular flow, referred to as primary flow 36 that flows in a primary annular duct of the gas generator 12, and a radially external annular flow, referred to as secondary flow 38 that flows in a secondary annular duct between the gas generator 12 and the nacelle 18 and provides most of the thrust for the turbine engine.

An inlet casing 40 structurally connects the gas generator 12 to the casing 16 and to the nacelle 18. The inlet casing 40 comprises an annular row of radially internal arms 42 extending into the flow duct of the primary flow 36, and an annular row of radially external straightener blading 44, also referred to as OGV (Outer Gear Vane), extending into the flow duct of the secondary flow 38.

The arms 42 are generally limited in number (less than ten) and are tubular and passed through by auxiliaries. These arms 42 have a structural role because they allow the transmission of forces between the bearing supports and the suspensions. They also have a role of passage of the auxiliaries, allowing to make pass the auxiliaries through the duct by fairing them, thus limiting the aerodynamic losses in the duct. These arms do not have a flow straightening function because they have no camber and are not sufficient in number to carry out this function.

The number of straightener bladings 44 (OGV) is generally higher than ten. They allow to straighten the flow of the fan thanks to a specific number and camber. They also have a structural function because they support the casing around the fan (fan casing).

The flow duct of the primary flow 36 is further passed through by additional straightener bladings 52, also referred to as IGV (Inner Gear Vane). The IGV 52 are evenly distributed around the axis A and are located upstream of the inlet casing 40 and more precisely upstream of the arms 42.

These bladings allow to straighten the flow from the fan 14 as it enters the primary duct. They do not have a structural role. They are in sufficient number (for example more than 10) and with a certain camber to straighten the flow of the fan penetrating the primary duct. The flow duct of the primary flow 36 is delimited by two coaxial annular envelopes, respectively internal 37a and external 37b. In particular, the IGV 52 and the arms 42 are connected to these envelopes 37a, 37b. The flow duct of the secondary flow 38 is delimited internally by an annular envelope 39 coaxial with the envelopes 37a, 37b, and externally by the nacelle casing 16. The OGV 44 are connected to the envelopes 37b, 39.

Each of the envelopes 37a, 37b, 39 may be formed by several adjacent walls or covers.

The rotor of the low-pressure body 12a as well as the fan shaft 32 are guided upstream by bearings 46, 48 and 50. These bearings 46, 48, 50 are of the ball or roller type and each comprise an internal ring mounted on the shaft to be guided, an external ring carried by an annular bearing support and a rolling bearing between the rings.

In a known manner, the reducer 33 is of the epicyclic gear train type and comprises a sun gear centred on the axis A, a ring gear extending around the axis, and planet gears that mesh with the sun gear and the ring gear and are carried by a planet carrier.

In the example shown, the ring gear is stationary and fixedly connected to a support 62 of the bearings 46, 48. The planet carrier is rotatable and coupled to the fan shaft 32. The sun gear of the reducer is coupled by an inlet shaft 56 to the main shaft 58 of the low pressure body.

The inlet shaft 56 is guided by the bearing 50 which is carried by a bearing support 60. The fan shaft 32 is guided by the bearings 46, 48.

The bearing supports 60, 62 extend around the axis A and are stationary parts connected to the stator and in particular to the inlet casing 40.

Figure 2:
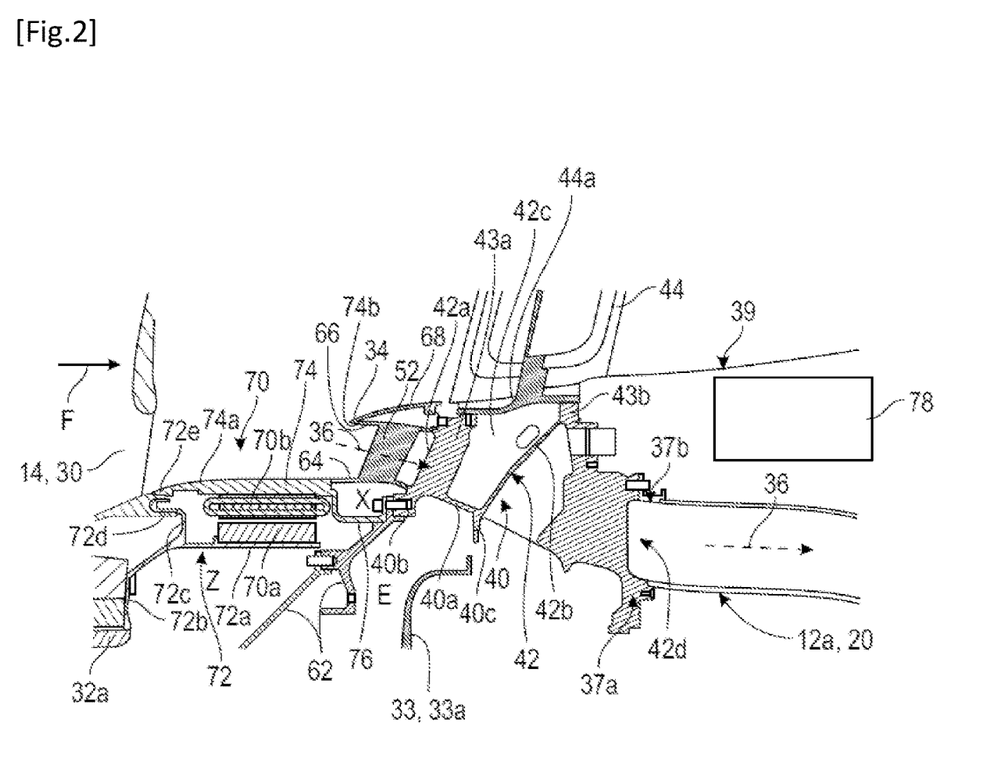
FIG. 2 is a partial schematic half-view in axial cross-section of an aircraft turbine engine according to the invention equipped with an electrical machine.

FIG. 2 is a more detailed and larger scale view of a portion of FIG. 1, and illustrates an embodiment of a turbine engine 10 according to the invention.

The elements of FIG. 2 that have already been described with reference to FIG. 1 are designated by the same references.

In particular, FIG. 2 shows the area Z located between the fan disc 32a and the reducer 33, in which an electrical machine 70 is installed. Only one support 33a of the ring gear of the reducer 33 is visible in FIG. 2, this element being connected, for example, to the inlet casing 40 or to the bearing support 62.

The cross-section in the drawing in FIG. 2 passes through one of the IGV 52s which is solid. As will be described in more detail below, however, at least one or some IGV 52 are special and are designated by the reference 52a. An IGV 52a of this type is shown in cross-section in FIG. 3.

The cross-section passes through an OGV 44 as well as through an arm 42 which is tubular for the passage of auxiliaries, as mentioned above. Each arm 42 comprises upstream an edge 42a and downstream an edge 42d, respectively leading edge and trailing edge of the primary flow 36.

Each arm 42 comprises an internal cavity 42c that is closed radially outward by a wall 44a of the OGV 44. This wall 44a is formed in one-piece with the OGV 44 and is attached to annular flanges, respectively upstream 43a and downstream 43b, of the inlet casing 40. The cavity 42c is isolated from the auxiliaries by the wall 42b.

The internal cavity 42c of each arm 42 is closed radially inward by an annular wall 40a of the inlet casing 40. At the upstream end of this wall 40a, the inlet casing 40 comprises a radially internal annular attachment flange 40b for attaching the bearing support 62. At the downstream end of the wall 40a, the inlet casing 40 comprises a radially internal annular attachment flange 40c for attaching, for example, an annular gutter for recovering oil projected by the reducer 33 by centrifuging.

The reducer 33 as well as the bearings 46, 48, 50 visible in FIG. 1 are located in an annular lubrication enclosure E which is delimited upstream by the bearing support 62 and at least one non-visible sealing joint, and downstream by the bearing support 60 and at least one non-visible sealing joint. The external periphery of the enclosure E is sealed in particular by the wall 40a.

FIG. 2 allows to show that the envelope 37a referred to above is formed by several successive annular walls such as the wall 40a and an annular ferrule 64 located upstream of the wall 40a and connected to the internal periphery of the IGV 52, 52a.

The envelope 37b is formed by a number of successive annular walls and in particular an annular ferrule 66 located upstream of the inlet casing 40. This ferrule 66 extends around the ferrule 64 and is connected to the external periphery of the IGV 52, 52a.

The envelope 39 is formed by several successive annular walls such as the wall 44a and an annular ferrule 68 located upstream of the wall 44a. This ferrule 68 extends around the ferrule 66 and the upstream ends of the ferrules 66, 68 are connected together to form the splitter nose 34.

As mentioned above, the electrical machine 70 is located in an annular area Z, this area Z being delimited upstream by the fan 14, and in particular the disc 32a connecting the fan vanes 30 to the fan shaft, and downstream by the bearing support 62.

The machine 70 is generally annular in shape and comprises a rotor 70a and a stator 70b. The rotor 70a has a generally annular shape extending about the axis A and is carried by a support element 72 which itself has a generally annular shape.

In the example shown, the support element 72 comprises a cylindrical wall 72a surrounded by the rotor 70a and attached to the internal periphery of the latter. The upstream end of this wall 72a is connected to a radially internal annular attachment flange 72b for attaching to the fan disc 32a, and to an external annular rim 72c.

The rim 72c comprises an internal cylindrical surface 72d bearing on an external cylindrical surface of the fan 14 so as to ensure the centring of the rotor 70a. The rim 72c further comprises external annular wipers 72e of a sealing joint of the labyrinth type.

The stator 70b is also generally annular in shape and is carried by an annular support element 74.

The element 74 comprises an external annular surface 74a which internally defines the flow duct of the gas flow F, between the fan 14 and the splitter nose 34. The element 74 is attached to the external periphery of the stator 70b and comprises an upstream end that cooperates, for example by means of an abradable annular coating, with the aforementioned wipers 72e.

The downstream end of the element 74 is axially aligned with the ferrule 64, an upstream peripheral edge of which is axially engaged in an annular gorge 74b of the element 74. This gorge 74b is oriented axially downstream. The engagement of the upstream edge of the ferrule 64 in the gorge 74b of the element 74 ensures an overlapping and thus avoids a step in the duct which would disturb the flow F.

The downstream end of the element 74 further comprises an annular attachment flange 76 for attaching to the bearing support 62 or to the inlet casing 40. This flange 76 is generally U-shaped in axial cross-section with the opening oriented radially outward. This flange 76 thus defines an annular space X which is used for the electrical connection of the stator 70b, as will be described in more detail in the following with reference to FIG. 3 in particular. In the example shown, the flange 76 is attached by screws to a flange of the bearing support 62 and to the flange 40b of the inlet casing.

The element 74 may be formed of a one-piece, or of two annular and coaxial parts mounted around each other.

One of the particularities of this installation lies in the fact that the electrical machine 70 and in particular its stator 70b is located as close as possible to the main flow F after passing through the fan 14. This allows to have an electrical machine with a large diameter and therefore with a higher potential power than the technologies proposed so far, and a machine that is cooled by the flow F. Advantageously, the thermal rejections of the electrical machine 70 are dissipated thanks to this cooling.

For this purpose, the surface 74a swept by the flow F preferably has an aerodynamic profile, as shown in the drawing. The element 74 ensures the heat exchange by thermal conduction between the stator 70b and the flow F.

The stator 70b is connected by electrical connection means to a power electronic circuit 78 which is located between the two envelopes 37b, 39 and thus around the gas generator 12.

FIGS. 3 to 7d illustrate an embodiment of these electrical connection means which include at least one, preferably rigid, bar 80.

Figure 3:
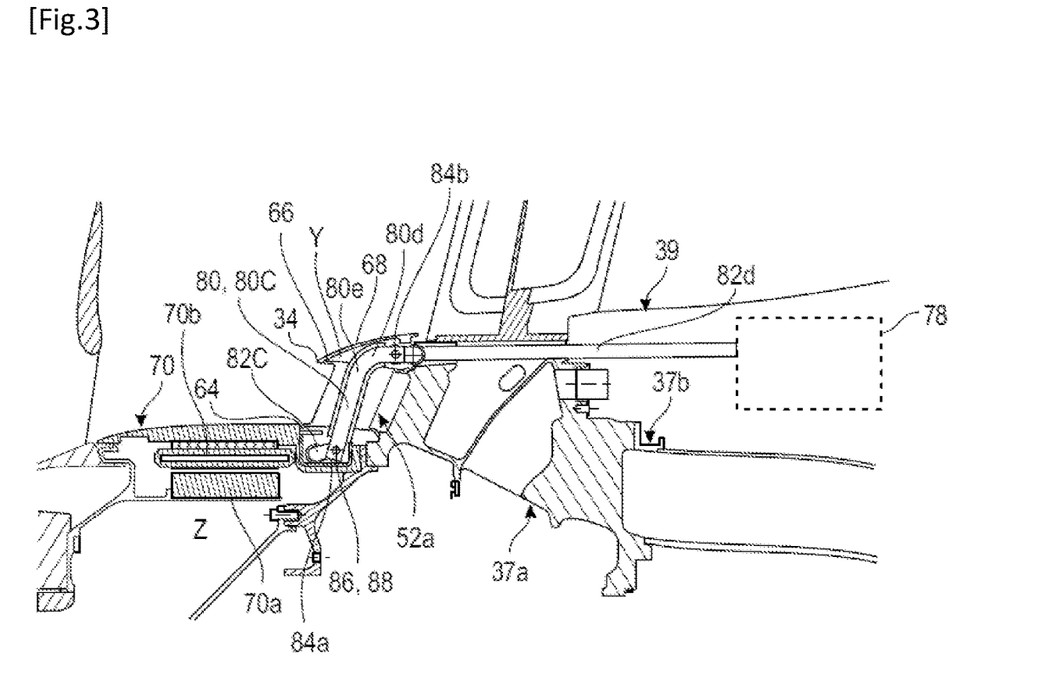
FIG. 3 is similar to FIG. 2 and shows an electrical connecting bar for electrically connecting a stator of the machine to a power electronic circuit.

Although one or more electrical harnesses 82c, 82d may additionally be used for the electrical connection of the stator 70b, at least one bar 80 is used, which provides many advantages.

Figure 8:
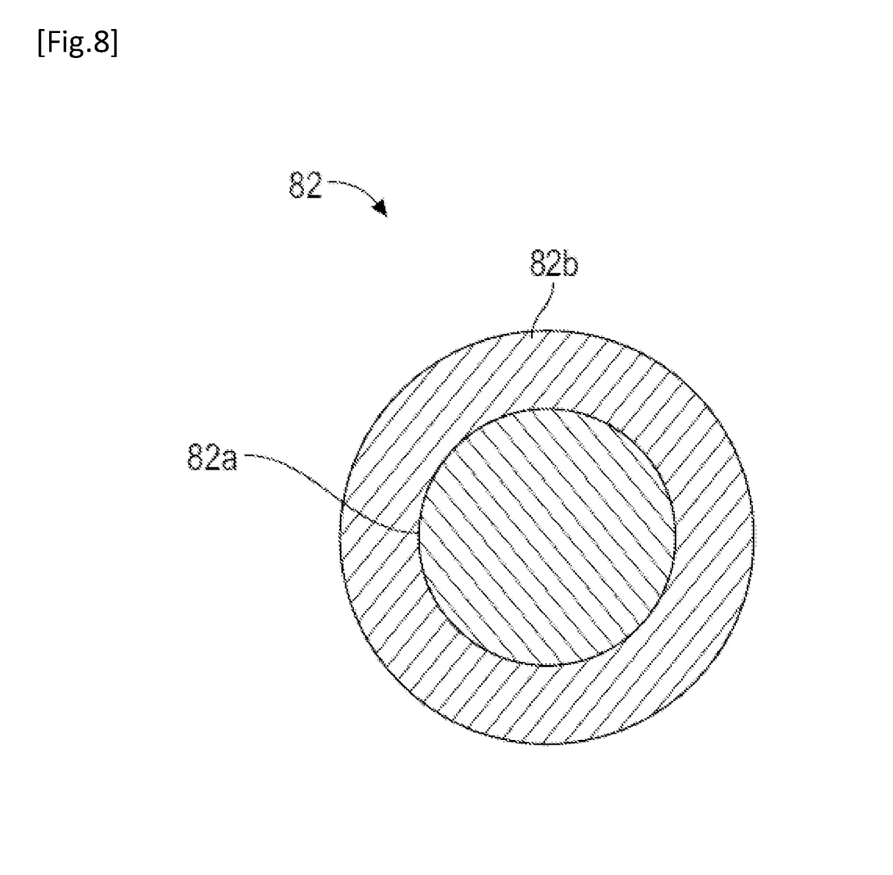
FIG. 8 is a schematic cross-sectional view of an electric harness.
Figure 9:
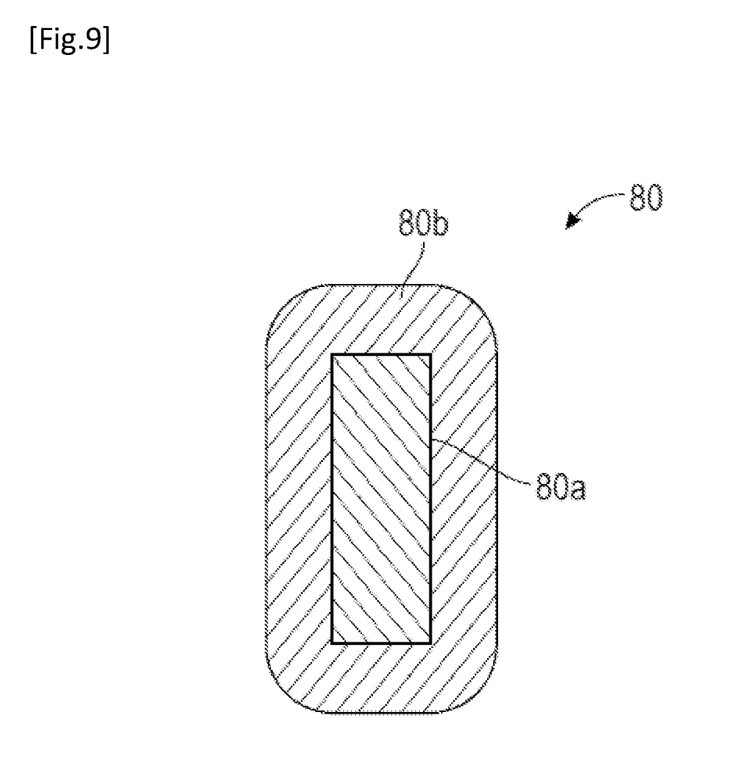
FIG. 9 is a schematic cross-sectional view of an embodiment of an electrical connecting bar.

In a preferred embodiment of the invention, the stator 70b is connected by a first electrical harness 82c to one end of the bar 80, the opposite end of which is connected by a second electrical harness 82d to the circuit 78 (FIG. 3). In this case, the cross-section of the core 82a of each harness 82c, 82d is preferably the same or close to the cross-section of the body 80a of the bar 80 (FIGS. 8 and 9). The cross-section of the bar 80 and in particular of its body 80a is preferably constant over the entire length of the bar.

Figure 6:
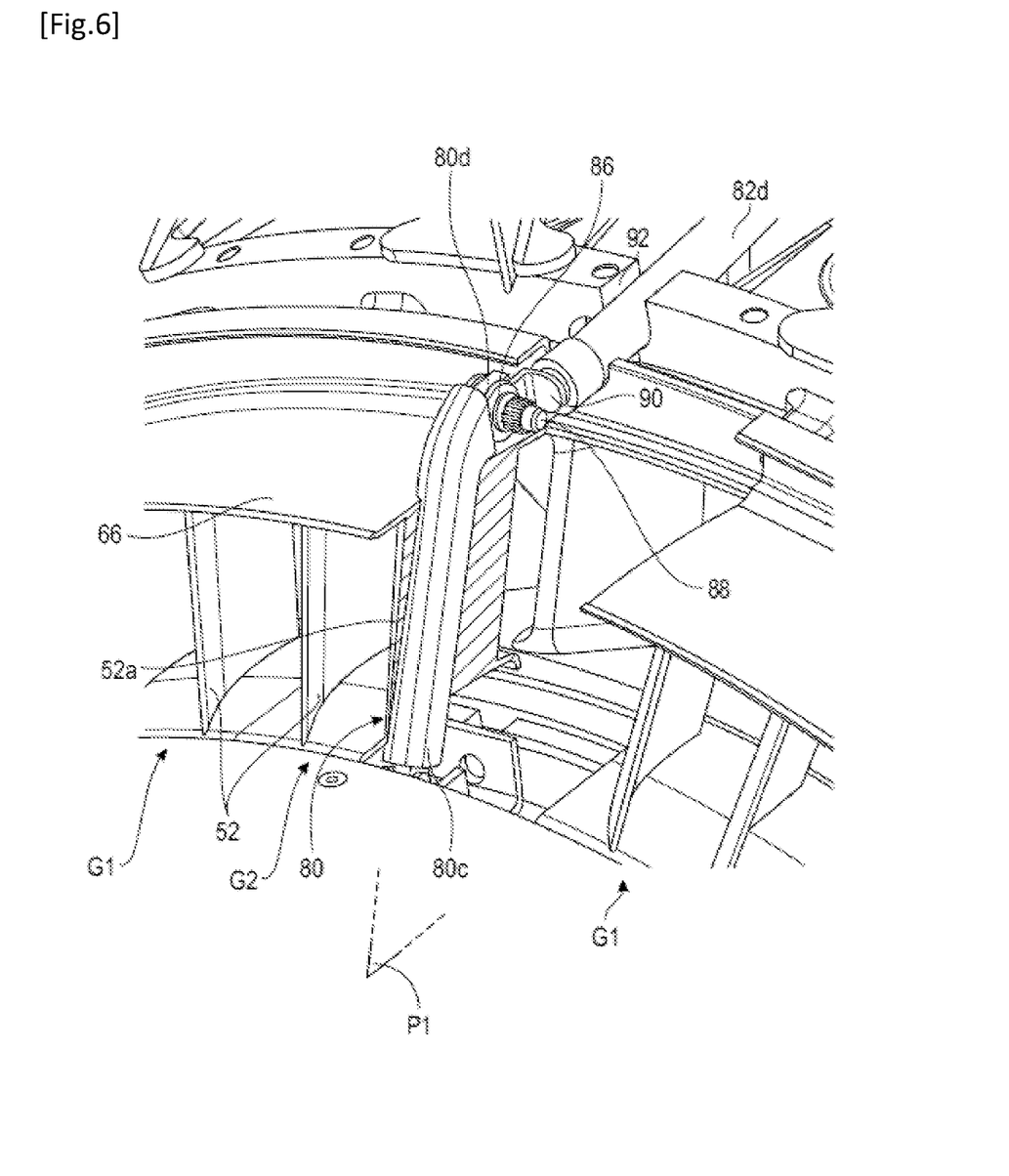
FIG. 6 is a schematic perspective view and with partial pull-out of a portion of the turbine engine in FIG. 3, showing the IGV, one of which is used to pass the electrical connecting bar.

The bar 80, visible almost in its entirety in FIG. 6, is shaped to run from the area Z, and in particular the space X, to the space Y located between the envelopes 37b, 39, just downstream of the splitter nose 34 and radially inside the ferrule 68.

The bar 80 may have a complex general shape, for example L, S, Z, etc. In the example shown, it extends in a plane P1 passing through the axis A and corresponding to the sectional plane in FIG. 3.

The bar 80 comprises an electrically conductive core 80a surrounded by an insulating sheath 80b (see FIGS. 8 and 9).

Figure 4:
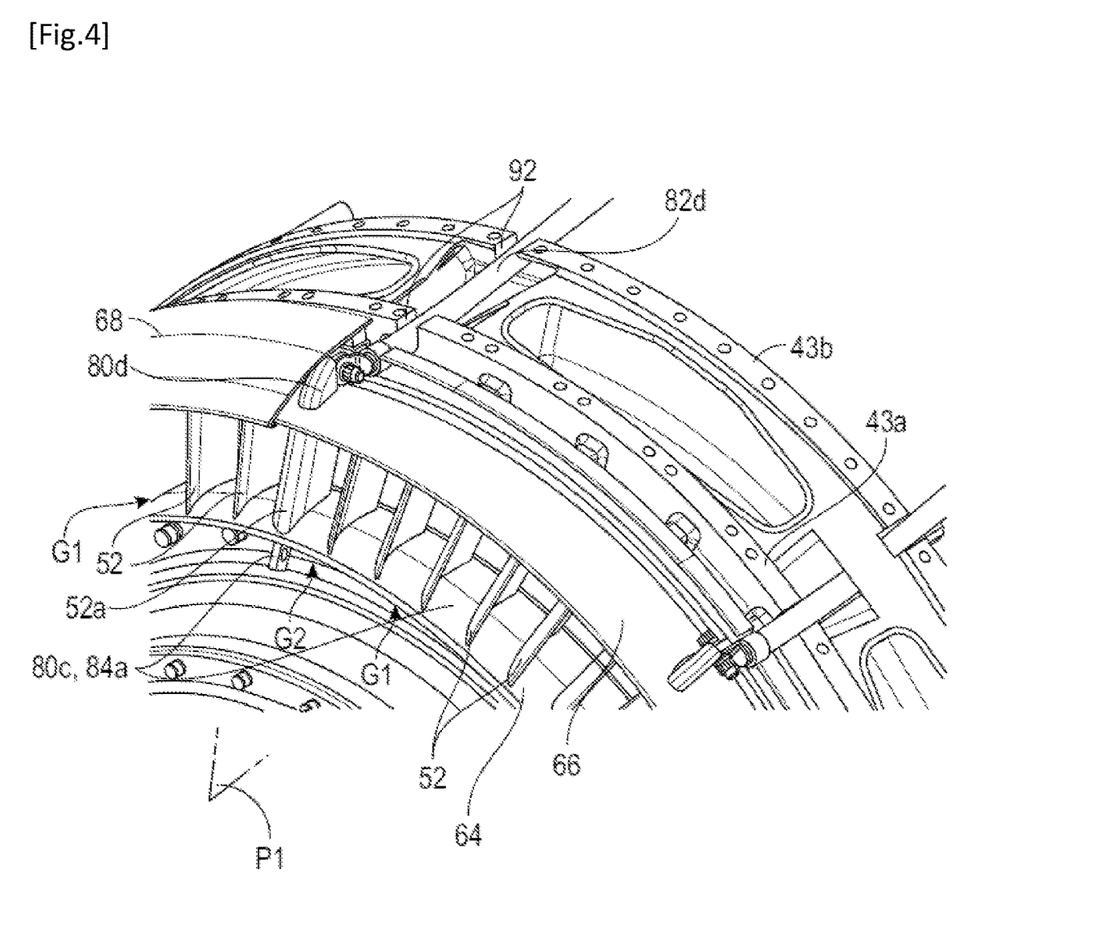
FIG. 4 is a schematic perspective view of a portion of the turbine engine of FIG. 3 and shows, in particular, IGV, one of which has an electrical connecting bar passing through it.
Figure 5:
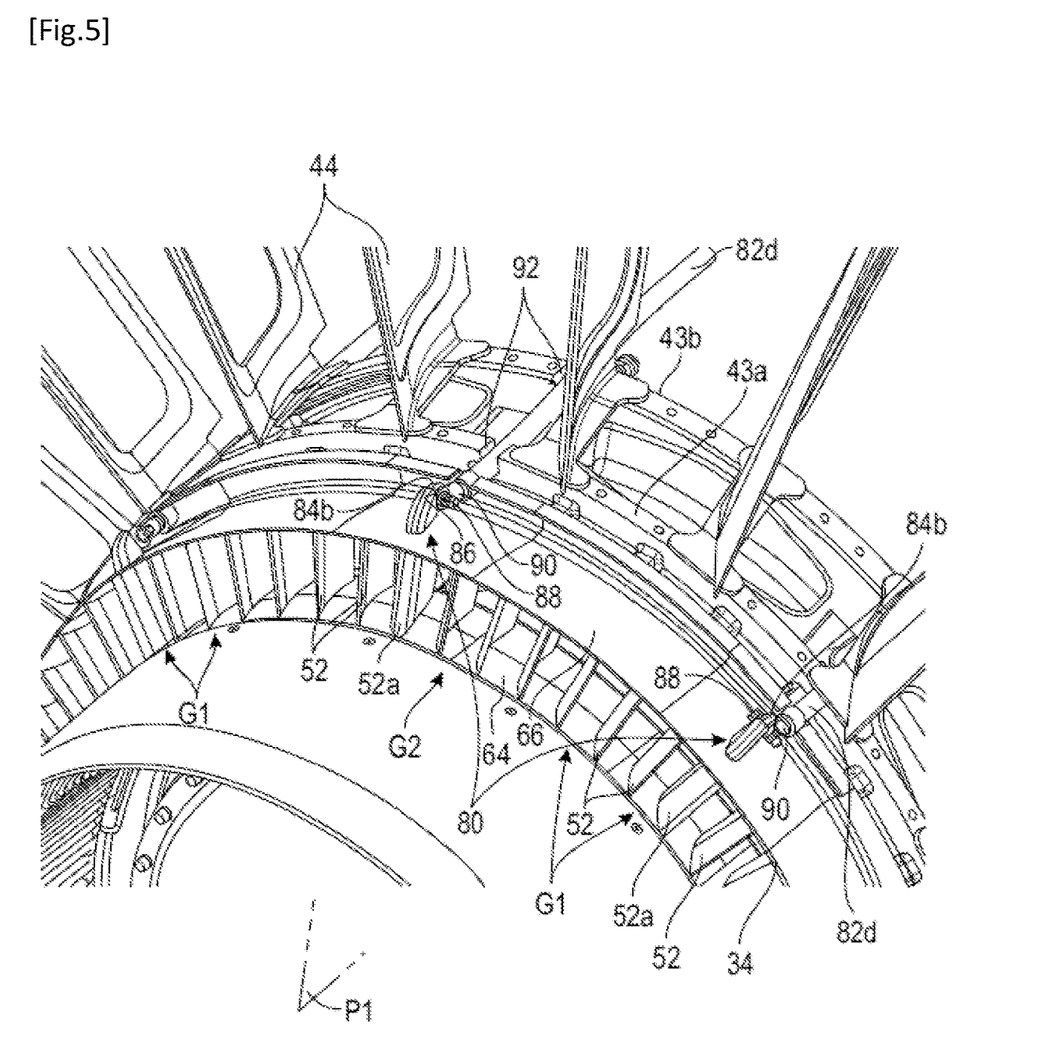
FIG. 5 is another schematic perspective view of a portion of the turbine engine of FIG. 3 and shows in particular the path of the electrical connecting bar.

The bar 80 comprises ends, upstream 84a and downstream 84b respectively, which are exposed, i.e. not covered by a sheath 80b, so that the bar 80 can be connected to the harnesses 82c, 82d (FIGS. 4-6).

The sheath 80 extends radially outward beyond the ferrule 66 and away from a free end 84b of the bar to leave that end free, and radially inward beyond the ferrule 64 and away from an opposite free end 84a of the bar to leave that end free.

Each of the ends 84a, 84b comprises an orifice 86 for mounting a bolt 88 (screw and nut, or even washer). This bolt 88 is used to attach an end 84a, 84b of the bar 80 to the corresponding harness 82c, 82d, preferably by means of a lug 90. The lug 90 is connected to one end of the harness 82c, 82d and comprises a plate intended to be applied to the corresponding end 84a, 84b and to be tightened and attached there by means of the bolt 88 (FIGS. 4-6).

The invention proposes a particular path of the bar 80 from the space X to the space Y, and more particularly between the harnesses 82c, 82d. Note that in practice, the stator 70b may be connected by several bars 80 to the circuit 78. These bars 80 are then preferably evenly distributed around the axis A and each connected by harnesses 82c, 82d to the stator 70b and to the circuit 78. The following description of a bar 80 therefore applies to each electrically connecting bar 80 for electrically connecting the stator 70b of the electrical machine 70 to the power electronic circuit 78.

In the embodiment shown in the drawings, the bar 80 runs through one of the IGV 52a.

More specifically, the bar 80 is generally L-shaped and comprises a first portion 80c extending substantially radially with respect to the axis A inside the IGV 52, and a second portion 80d extending substantially parallel to the axis A between the envelopes 37b, 39, and just upstream of one of the OGV 44.

The portions 80c, 80d are substantially rectilinear and connected to each other by a bent junction 80e located directly downstream of the splitter nose 34, between the ferrules 66, 68. To the extent that, as in the example shown, the IGV 52 may be inclined outwardly from upstream to downstream, the first portion 80c may have a similar inclination.

The portion 80c is longer than the portion 80d.

It can be seen from FIG. 3 that the end 84a is located in the aforementioned space X and connected by the bolt 88 to the harness 82c in that space X. It is thus understood that the bar 80 and in particular its portion 80c passes through the ferrules 64, 66 as it runs through the IGV 52a.

One of the particularities of the invention is that each of the envelopes 37a, 37b is sectorised at the level of the IGV 52, 52a. The ferrules 64, 66 are thus sectorised and each sector of the ferrule 64 being connected by one or more IGV 52, 52a to a sector of the ferrule 66.

In the example shown in FIGS. 4 to 6, each ferrule sector 64 is connected by 3 or 4 IGV to a ferrule sector 66. The assembly formed by a ferrule sector 64, a ferrule sector 66 and the IGV form a bladed angular segment.

The turbine engine 10 comprises several segments distributed around the axis A and arranged circumferentially end to end. The segments are of two types. The first type of segment, noted G1, comprises only IGV 52 (4 in number in this case), while the second type of segment, noted G2, comprises an IGV 52a or even IGV 52 (2 in number). It is therefore understood that each segment G2 is further associated with a bar 80 which passes through the IGV 52a.

Due to the difference in the number of IGV between the segment types G1, G2, the segments may have different dimensions in the circumferential direction. The segments G1 thus have a larger circumferential dimension than the segments G2 in the example shown.

A further particularity of the invention is that the bar 80 cannot be separated or disassembled from its segment G2 and vice versa. This means that the bar 80 can only be disassembled and removed from the turbine engine with its segment G2.

The ferrule 68 is also sectorised and comprises sectors that are releasably attached. Each of the segments G1, G2 is associated with a ferrule sector 68.

In particular, FIG. 6 allows to show that the material of the IGV 52a is tightly bonded to the bar 80 and overlaps its sheath 80b without clearance. The sheath 80b is thus embedded in the material of the IGV 52a. The IGV 52a through which the bar 80 passes is therefore solid in that its material extends seamlessly from the sheath 80b to the aerodynamic external faces of the IGV, which may form an intrados and an extrados respectively.

It can be seen from FIGS. 4 to 6 that each IGV 52a for passage of the bar 80 is oversized. It is understood that the number of oversized IGV 52a will depend on the number of electrically connecting bars 80 for electrically connecting the machine 70 to the circuit 78, each bar 80 passing through one of these oversized arms.

From FIGS. 4 to 6 it can be seen that the portion 80d of the bar 80 is aligned with notches 92 in the flanges 43a, 43b. These are axial notches 92 formed at the external periphery of the flanges 43a, 43b for attaching the OGV 44 and shaped so that the harness 82d connected to the bar 80 can run through these notches 92 without interfering with the attachment of the OGV 44 to the flanges 43a, 43b. The notches 92 are thus arranged so that the harness 82d runs between two adjacent OGV 44.

FIGS. 7a to 7d illustrate steps in a maintenance method for the turbine engine 10.

In the order shown for the steps illustrated in FIGS. 7a to 7d, these steps allow a disassembling of the bar 80. It is understood that it is sufficient to repeat these steps in the reverse order to carry out an assembly or reassembly of the bar 80.

Figure 7A:
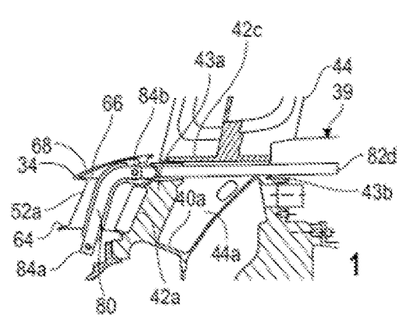
FIGS. 7a-7d are views of a detail of FIG. 3 and illustrate steps of a maintenance method for the turbine engine.
Figure 7B:
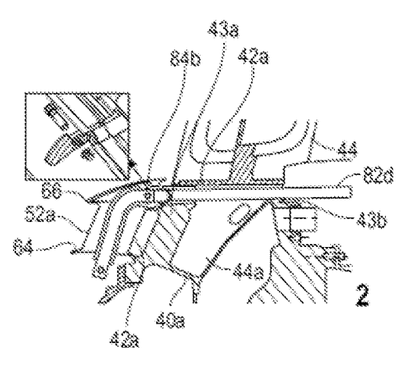

In the first step illustrated in FIGS. 7a and 7b, at least one portion of the third envelope 39 is disassembled and removed, in particular at the level of the bar 80. This involves disassembling and removing a sector of the ferrule 68 (FIGS. 7a and 7b).

Figure 7C:
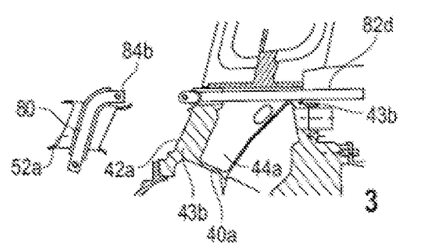

A further step is then to disengage the ends 84a, 84b of the bar 80 from the harnesses 82c, 82d. The bar 80 is then disassembled and can be removed with its segment G2, as shown in FIGS. 7b and 7c, for example by axial translation upstream.

Figure 7D:
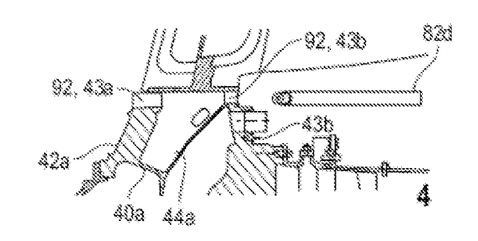

Finally, FIG. 7d shows a last step in which the harness 82d which is no longer connected to the bar 80 is removed by axial translation downstream through the notches 92 in the arms 43a, 43b.

FIG. 8 shows a cross-section of an electric harness 82 that is generally circular in shape and comprises a conductive core 82a formed by a strand of wires and an insulating external sheath 82b. FIG. 9 shows an example of embodiment of a bar 80, which comprises a conductive body 80a preferably having a polygonal shape and for example rectangular in cross-section. The bar 80 further comprises an insulating external sheath 80b.

Some advantages of the invention have been described above. Further advantages of the invention include:
- the path of the bar is compatible with all the oil auxiliaries circulating in the arms of the inlet casing. In addition, the walls installed in the arms of the inlet casing isolate the bars from the oil auxiliaries, which limits the risk of a fire occurring;
- the modularity designed to optimise/facilitate the assembly and disassembly of a "driver" segment without disassembled the OGV;
- the bar 80 allows, contrary to a harness, very short bending radii, which, in the environment in question, is essential; this allows to limit the thickness of the splitter nose 34 to a thickness close to that of the bar 80;

when the bar 80 is rigid, there is no risk of vibrations due to too much flexibility and therefore no need for specific support in the arms of the inlet casing 40;

the path described above is compatible with all the oil auxiliaries circulating in the arms of the inlet casing 40; moreover, the walls of the inlet casing 40, and in particular the walls 40a and 42b, isolate the bar 80 from these oil auxiliaries, which limits the risk of fire; and the modularity due to the ease of assembly/disassembly of the bar 80 by removing only one segment of the turbine engine.

This invention could be applied to any turbine engine equipped with an electrical machine upstream of a structural casing such as an inlet casing or other.

The invention claimed is:

1. An aircraft turbine engine, comprising:
a gas generator having a longitudinal axis,
a fan located at an upstream end of the gas generator and configured to rotate about said axis, and
an electrical machine of generally annular shape which is mounted coaxially downstream of the fan, and which comprises a rotor coupled in rotation to the fan, and a stator,
the fan being configured to generate a main gas flow, a portion of which flows into a primary annular duct of the gas generator to form a primary flow, and another portion of which flows around the gas generator to form a secondary flow,
the primary duct being delimited by a first and a second annular envelopes coaxial with the gas generator, the primary duct being passed through by bladings, referred to as Inner Gear Vane (IGV), connecting the first and second envelopes, as well as by tubular arms of an inlet casing located downstream of the IGV,
the gas generator comprising a third annular envelope which coaxially surrounds the second envelope, the second and third envelopes being connected together at their upstream ends to form an annular splitter nose for separating the primary and secondary flows,
the stator of the electrical machine being connected to a power electronic circuit by at least one electrically conductive bar which extends substantially radially with respect to said axis inside one of the IGV,
wherein said first and second envelopes are sectorised, each of the sectors of the first envelope being connected by IGV to one of the sectors of the second envelope, to form bladed angular segments, only a portion of these segments comprising an IGV passed through by said at least one bar which is rigidly connected to that IGV and to that segment and which is configured to be disassembled and removed from the turbine engine by disassembly and removal of that segment.

2. The turbine engine of claim 1, wherein the bar passes through the IGV without clearance.

3. The turbine engine according to claim 2, wherein the bar comprises an electrically conductive core surrounded by an insulating sheath, the insulating sheath being embedded in a material of the IGV.

4. The turbine engine according to claim 3, wherein the IGV through which the bar passes is solid, its material extending seamlessly from the sheath to aerodynamic external faces of the IGV.

5. The turbine engine according to claim 3, wherein the sheath extends radially outwardly beyond the second envelope and away from a free end of the bar to leave that end free, and radially inwardly beyond the first envelope and away from an opposite free end of the bar to leave that end free.

6. The turbine engine according to claim 1, wherein the third envelope is sectorised and comprises sectors which are releasably attached to the second envelope, each of the segments being associated with a sector of that third envelope.

7. The turbine engine according to claim 1, wherein the bar comprises a radially internal end for releasably attaching to an element for electrically connecting to said stator, and a radially external end for releasably attaching to a harness for electrically connecting to said circuit.

8. The turbine engine according to claim 1, wherein the or each IGV through which a bar passes is oversized relative to the other IGV.

9. A bladed angular segment for a turbine engine according to claim 1, this segment comprising:
a first annular envelope sector,
a second annular envelope sector,
at least one IGV that extends between these sectors and connects them together,
an electrically conductive bar which passes through the IGV or one of the IGV and which is non-detachable from that arm and the segment.

10. A method for maintaining a turbine engine according to claim 1, comprising the steps of:
a) disassembling and removing at least one portion of the third envelope, in particular at the level of said bar, and
b) disassembling and removing a segment secured to a bar.

11. The method according to claim 10, wherein it comprises one or more of the following steps:
during the steps a) and b), maintaining in place the connection bladings, referred to as Outer Gear Vane (OGC), for connecting a nacelle casing to said third annular envelope,
between the steps a) and b), dissociating the bar from at least one electrical connecting harness,
after the step b), removing an electrical connecting harness, this harness extending parallel to said longitudinal axis and being removed by axial translation towards downstream through arrangements of one of the tubular arms of the inlet casing.

* * * * *